United States Patent [19] [11] Patent Number: 5,289,316
Fürter [45] Date of Patent: Feb. 22, 1994

[54] MEASURING OBJECTIVE

[75] Inventor: Gerd Fürter, Ellwangen, Fed. Rep. of Germany

[73] Assignee: Carl-Zeiss-Stiftung, Heidenheim, Fed. Rep. of Germany

[21] Appl. No.: 856,122

[22] Filed: Mar. 23, 1992

[30] Foreign Application Priority Data

Mar. 22, 1991 [DE] Fed. Rep. of Germany ....... 4109484

[51] Int. Cl.⁵ ..................... G02B 13/10; G02B 13/18; G02B 5/04
[52] U.S. Cl. .................................. 359/669; 359/709; 359/837
[58] Field of Search ................. 359/669, 837, 709

[56] References Cited

U.S. PATENT DOCUMENTS

| | | |
|---|---|---|
| 3,637,308 | 1/1972 | Van Raalte et al. ............... 359/669 |
| 4,637,691 | 1/1987 | Uehara et al. ....................... 359/837 |
| 4,867,545 | 9/1989 | Wakimoto et al. ................. 359/663 |
| 5,113,244 | 5/1992 | Curran ................................. 359/709 |

Primary Examiner—Scott J. Sugarman
Attorney, Agent, or Firm—Walter Ottesen

[57] ABSTRACT

The invention is directed to a measuring objective having a large free operating space and having very small imaging errors with respect to coma, astigmatism and distortion. The main rays are, at least at one objective side, inclined to each other in one directional component and are parallel to each other in the directional component perpendicular thereto.

14 Claims, 4 Drawing Sheets

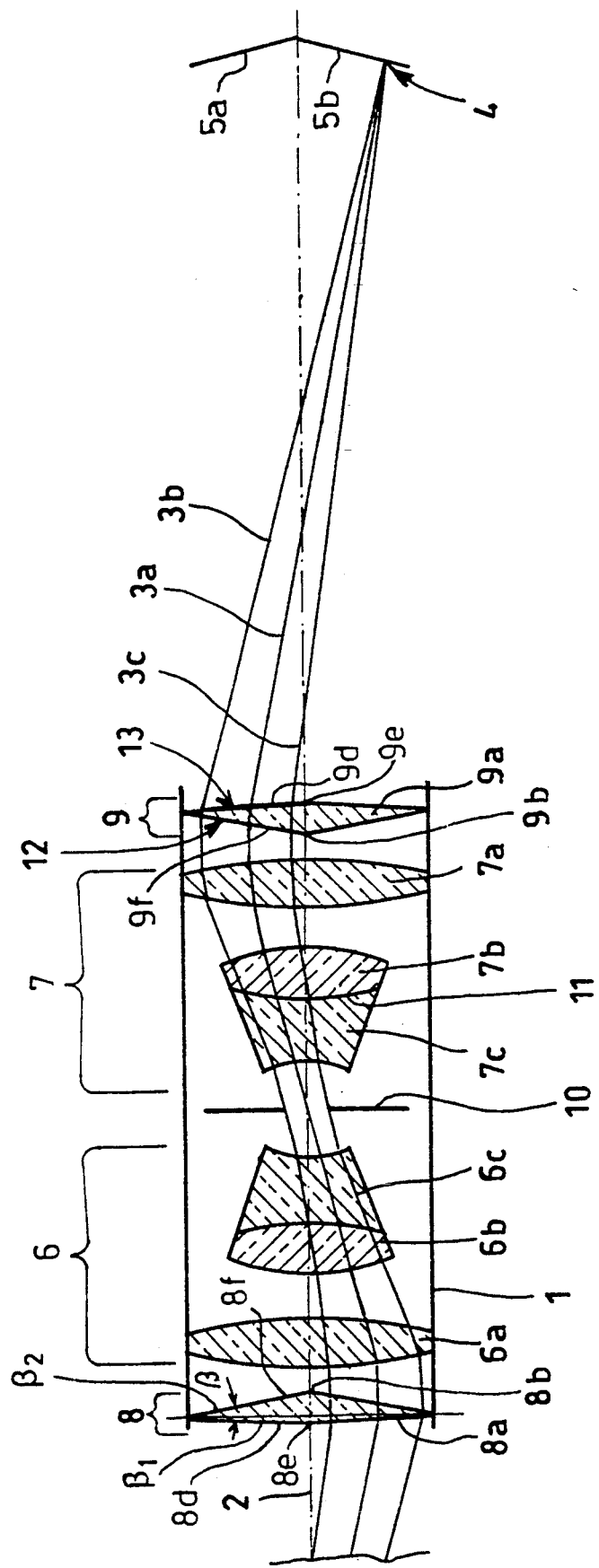

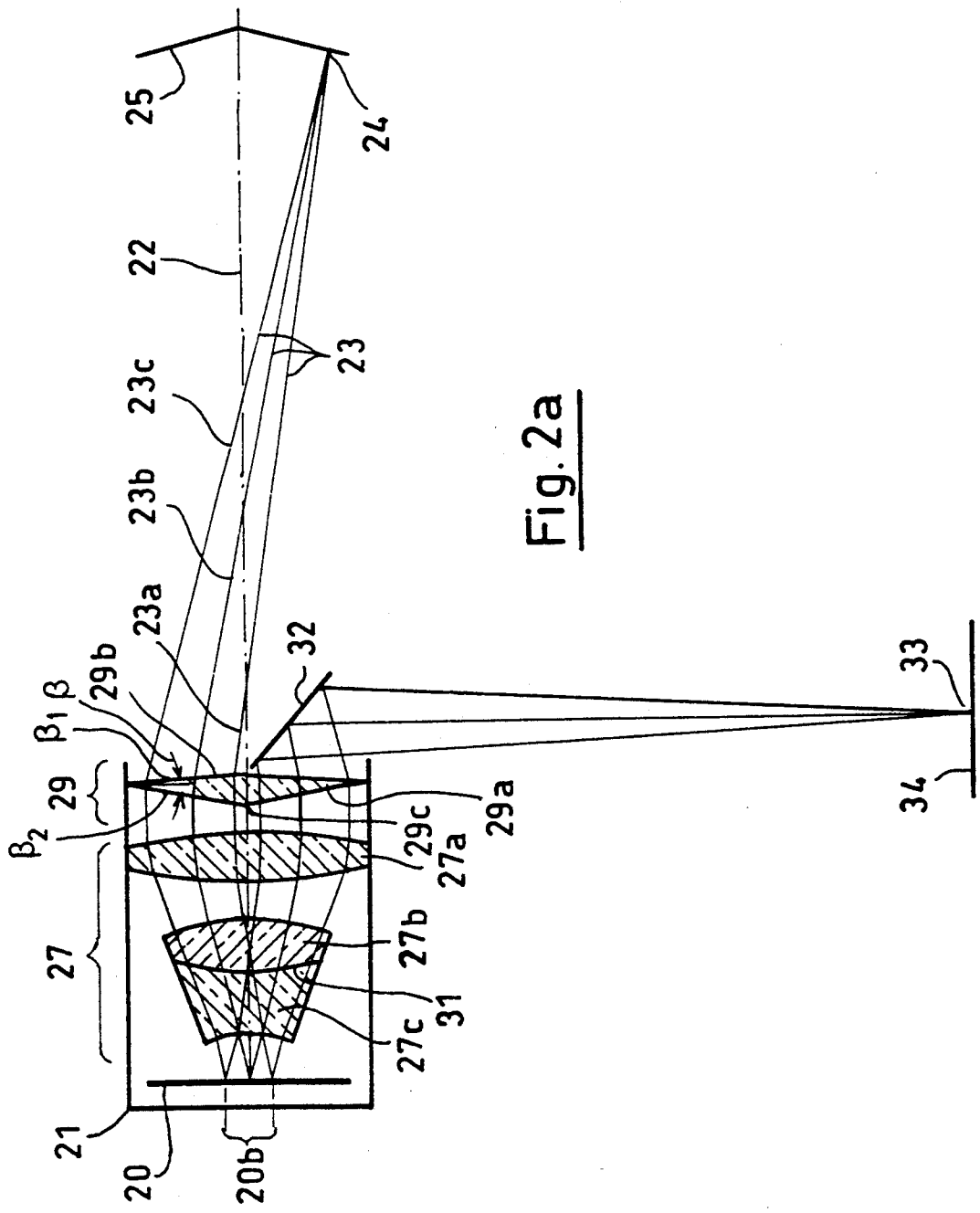
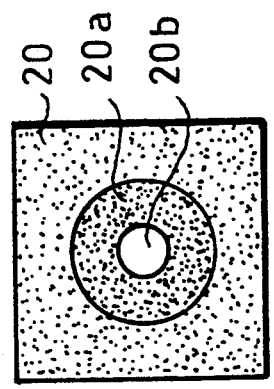
Fig. 2a
Fig. 2b

MEASURING OBJECTIVE

FIELD OF THE INVENTION

The invention relates to an objective for measuring distances. The objective has at least one lens assembly with this lens assembly being configured of several lenses and having at least one beam deflecting unit at the beam entry or at the beam exit of the objective with the beam deflecting unit comprising at least one element.

BACKGROUND OF THE INVENTION

Measuring objectives of this kind are utilized to image the light of a light source on at least one measuring surface or to image the light coming from at least one measuring surface on an image plane and to there, with the aid of an appropriate sensor, effect a conversion into a signal to be further processed. It is here essential that an optical relationship as simple as possible exists between the distance to be measured and the received signal and that the optical imaging errors of the measuring objective do not falsify the measuring result in the wanted resolution range in order to avoid a computation-intensive correction of the measured values and in order to rapidly arrive at precise and reproducible results.

A further essential feature of such measuring objectives is that the free operating range between the measured surface and the objective is selected to be as large as possible. The measuring arrangement assembled with the measuring objective can remain built up even for manipulations in the region of the surface to be measured only when a large free operating range can be realized with the measuring objective; that is, measurements can be made over inaccessible regions.

U.S. Pat. No. 4,867,545 discloses a telecentric image forming system having variable magnification. Although the system described there is for an illuminating apparatus, the system can also be used for a measuring arrangement. A parallel beam path of the main rays is obtained with the objective having a symmetrical configuration of the lenses. In this context, reference may be made to FIG. 9 and FIGS. 13a to 13e of this patent. A similar objective having a symmetrical configuration of the lenses is disclosed in European published patent application EP-OS 0,299,472 (see especially FIGS. 1, 17, 19, 21, 23 and 29).

It is disadvantageous that these objectives have no beam deflecting units suitable for measuring distance.

SUMMARY OF THE INVENTION

It is an object of the invention to provide a measuring objective having a large free operating space with the lowest possible imaging errors with respect to coma, astigmatism and distortion wherein the main rays are inclined toward each other in one directional component on at least one side of the objective and wherein the main rays are parallel to each other in the directional component perpendicular thereto.

The objective of the invention is for measuring distances and includes: at least one lens group defining an optical axis and including a plurality of lenses; a first beam deflecting unit mounted on the axis forward of the lens group to define a beam entry surface; a second beam deflecting unit mounted on the axis rearward of the lens group to define a beam exit surface; the first deflecting unit including a refracting optical wedge having a first side defining the entry surface and a second side facing away from the first side; the second deflecting unit including a refracting optical wedge having a first side defining the exit surface and a second side facing away from the first side of the refracting optical wedge of the second deflecting unit; the first deflecting unit having a first break formed on one of the sides thereof and the second deflecting unit having a second break formed on one of the sides thereof; and, the first and second breaks being substantially perpendicular to the optical axis and being substantially parallel to each other.

With the objective according to a first embodiment of the invention, structures such as lines, gratings, squares and the like can be imaged on surfaces to be measured. In addition to projections, the objective is suitable for imaging structured surfaces on suitable detectors.

When the objective provides a telecentric image without beam deflection units, then all entering and exiting main rays are parallel. The main rays still run parallel between the objective and the optical wedge when, for example, a refracting optical wedge is placed behind the objective. On the other hand, the main rays run parallel in one directional component behind the optical wedge and are inclined in the direction toward the optical axis perpendicular thereto. A very large magnitude for coma then occurs. This large magnitude for the coma is reduced in that a second refracting optical wedge is placed ahead of the objective.

Advantageously, the total optical path of each ray of any desired opening bundle of rays is of the same length at least in the sum through all beam deflecting units. In this way, no additional coma is generated by the beam deflecting units at the beam entry and at the beam exit. The opening bundle of rays is that light bundle (which emanates from a point and) includes all the rays passing through the limiting opening into the objective.

In general, prismatic wedges generate considerable astigmatism. For a pregiven desired deflection, there exists exactly one combination of component deflections at the two wedge surfaces of each wedge so that no astigmatism occurs. The same effect is obtained when the astigmatism in the sum of all optical wedges is eliminated. This combination is the same for all main rays when the main rays are parallel.

If a symmetrical objective having a 1:1 imaging is used, then this imaging is characterized by minimal errors with respect to distortion, coma and the chromatic variations thereof. If the two beam deflecting units are disposed symmetrically to the objective center (the deflections above and below the break can be different), then the above-mentioned optical characteristics are maintained.

Symmetrical optical relationships are obtained above and below the break when the optical wedges are assembled so as to be mirror-symmetrical with respect to a plane through the breaks.

The two optical wedges generate two separate measuring regions. If the breaks of the optical wedges are aligned in a plane which contains the optical axis, then both measuring have regions are optimally large. The optical wedges are advantageously easier to manufacture when the wedges planar beam pass-through surfaces.

BRIEF DESCRIPTION OF THE DRAWINGS

The invention will now be described with reference to the drawings wherein:

FIG. 1 is a schematic representation of a measuring objective according to the invention having an optical wedge at the beam entry and an optical wedge at the beam exit;

FIG. 2a is a schematic representation of a measuring objective according to another embodiment of the invention containing only one refracting optical wedge;

FIG. 2b is a schematic of the inner mirror in the measuring objective of FIG. 2a; and, FIG. 3 is a measuring arrangement which includes the measuring objective of FIG. 1.

DESCRIPTION OF THE PREFERRED EMBODIMENTS OF THE INVENTION

Figure 1A:
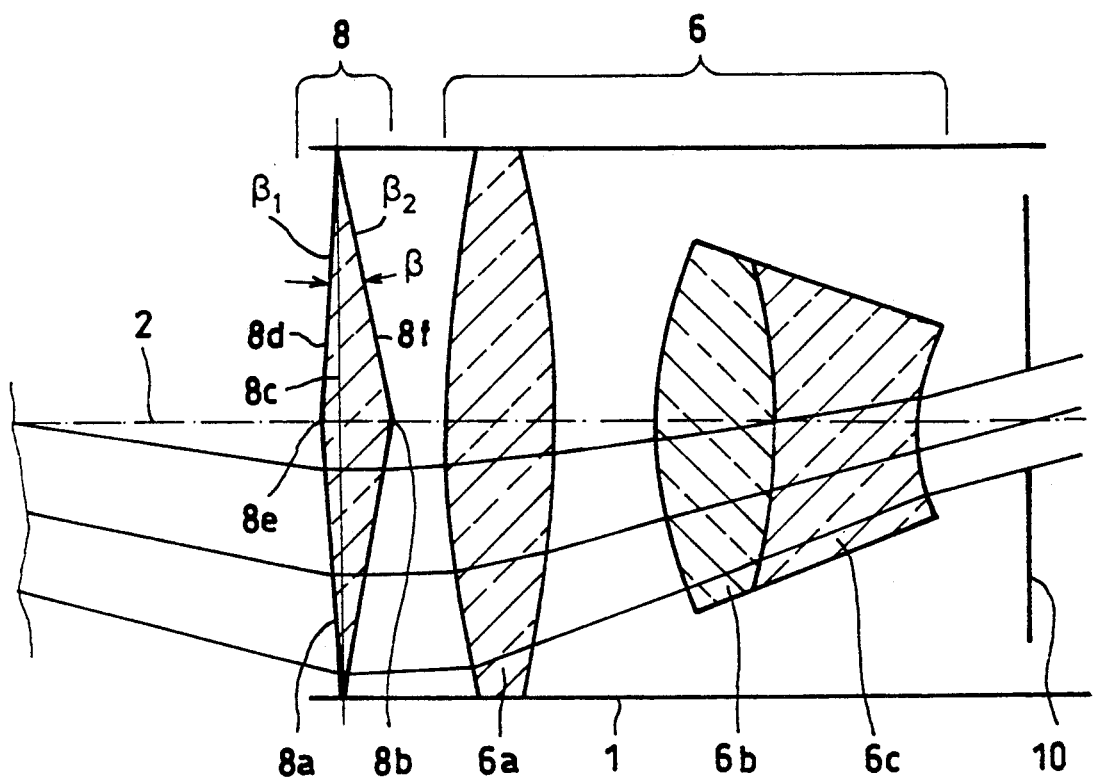
FIG. 1a shows an enlarged portion of one of the optical wedges of the objective of FIG. 1.

The objective 1 shown in FIG. 1 comprises two lens groups 6 and 7 and two beam deflecting units 8 and 9. The first lens group 6 includes a plurality of individual lenses (6a to 6c). The second lens group 7 comprises several individual lenses (7a to 7c). Both lens groups and beam deflecting units are arranged mirror-symmetrically to an inner diaphragm 10. The optical axis 2 passes precisely centrically through the circular diaphragm 10 which is disposed in the center of the objective 1.

Each lens group (6, 7) comprises a positive lens (6a, 7a) and an achromatic lens unit (6b, 6c; 7b, 7c). Each achromatic lens unit (6b, 6c; 7b, 7c) comprises a positive lens (6b; 7b) and a negative lens (6c; 7c) with the two lenses (6b, 6c; 7b, 7c) of each achromatic lens unit (6b, 6c; 7b, 7c) being arranged closely one behind the other and being connected to each other by a cement layer 11 in a known manner. The negative lens surfaces of achromatic lens units (6b, 6c; 7b, 7c) are in the direction toward the diaphragm 10. The two achromatic lens units (6b, 6c; 7b, 7c) are arranged about the inner diaphragm 10; whereas the two positive lenses (6a, 7a) are arranged at the beam entry and the beam exit.

The two positive lenses (6a, 7a) and also the two achromatic lens units (6b, 6c; 7b, 7c) are arranged so as to be mirror-symmetrical to each other with respect to the diaphragm 10, that is, the diaphragm 10 is disposed in an imaginary mirror plane. Both lens groups are configured identically.

The beam deflecting units (8, 9) for the objective 1 shown here each comprise only an optical wedge, namely, a double prism (8a, 9a). Both double prisms (8a, 9a) have identical forms. Each double prism (8a, 9a) is assembled to be mirror-symmetrical to the optical axis 2 and each has two planar surfaces intersecting at an acute angle $\beta$ as shown in FIG. 1a. If the two acute end points of the double prisms (8a, 9a) are connected to each other by an imaginary connecting line 8c, then the component angle $\beta_2$ of the total angle $\beta$ is a multiple of the component angle $\beta_1$ between the connecting line 8c of the end points and the surfaces (8d, 9d) of the double prisms (8a, 9a) facing toward the beam entry or the beam exit with the surfaces (8f, 9f) corresponding to component angle $\beta_2$ facing toward the interior of the objective. Both double prisms (8a, 9a) are symmetrical to the objective center point, more particularly, they are arranged symmetrically to the inner diaphragm 10.

The objective 1 supplies a telecentric imaging since the entry pupil and the exit pupil lie at infinity. All main rays entering and exiting the lens assembly groups (6, 7) are parallel to the optical axis and therefore have the same angle of incidence with respect to the double prisms (8a, 9a). The angles $\beta_1$ and $\beta_2$ are so selected that no astigmatism is generated for the total deflection dependent upon $\beta$. Because of the telecentricity, the "astigmatism-zero" position is the same for all image sizes; that is, the astigmatism is also held low.

Both lens groups (6, 7) as well as object position and image position are arranged symmetrically with respect to the inner diaphragm 10. For this reason, the objective supplies a 1:1 imaging. In this way, it is ensured that no unsymmetrical imaging errors will occur because of the lens groups (6, 7) of the objective 1; that is, this objective has no coma, no distortion and no chromatic variations of distortion.

If only one optical wedge were used, then an intense coma would occur. Only when (which is not necessary for measuring purposes per se) a corresponding optical wedge is placed on the image end (here, the same symmetry with respect to the objective center and symmetrical to the break plane), is the coma compensated since all rays (3a, 3b, 3c) of a narrow beam of light have the same optical path. The break plane is the plane in which the edges or breaks (8b, 8e; 9b, 9e) of the two double prisms (8, 9) lie. The breaks define a line on each side of each prism and are the abutting edges of the upper and lower planar surfaces at both sides of each prism. The two lines of each double prism define a plane passing through the optical axis 2 perpendicular to the plane of the drawing.

In the image space, the main rays run in a directional component parallel to each other whereas the main rays run inclined to each other in another directional component.

The substantial advantage of this objective is seen in that the imaging errors are minimal. In this context, it is noted that the two image planes (5a, 5b) are slightly inclined toward each other. However, this is no problem for most measuring tasks and is even unnecessary for objectives having a high depth of field.

In the drawing, the relationships are somewhat exaggerated in order to clearly show the paths of rays (3a, 3b, 3c). The number of lenses of the lens assembly groups and the beam deflecting units (optical wedges) can be different in dependence upon the requirements imposed in practical embodiments.

Another embodiment of the invention is shown in FIG. 2a. The objective 21 defines an optical axis 22 and comprises a lens assembly group 27 which includes several individual lenses (27a to 27c) and a beam deflecting unit 29 comprising a double prism 29a. Furthermore, a mirror 20 is disposed in the objective 21 which is reflective only in a central circular region 20b; whereas, the mirror absorbs radiation impinging thereon in light absorbing region 20a outside of this region 20b. This mirror 20 operating as a diaphragm is shown in a front elevation view in FIG. 2b where the reflective circular central region 20b is clearly seen.

As in FIG. 1, the lens assembly group 27 comprises a positive lens 27a and an achromatic lens unit (27b, 27c). The achromatic lens unit (27b, 27c) comprises a positive lens 27b and a negative lens 27c with both lenses (27b, 27c) being mounted closely one behind the other and being connected tightly to each other in a known manner by means of a cement layer 31. The negative lens surface of the achromatic lens unit (27b, 27c) faces in the direction of the mirror 20 acting as a diaphragm.

A beam deflecting unit 29 is disposed at the beam entry and at the beam exit. The beam deflecting unit 29 is shown in FIG. 2a and comprises one element, namely, an optical wedge 29a. This optical wedge 29a is configured so as to be mirror-symmetrical to the optical axis 22 and has two planar surfaces above and two planar surfaces below the optical axis 22. These surfaces intersect at angle $\beta$. If the two acute end points of the wedges 29a are connected to each other, then the component angle $\beta_2$ of the total angle $\beta$ is a multiple of the component angle $\beta_1$ between the connecting line of the end points and the surfaces of the wedge 29a facing toward the ray input or ray exit. The component angle $\beta_2$ faces toward the objective interior.

This objective 21 also provides a telecentric imaging since the entry pupil and the exit pupil lie at infinity. All incoming rays and all exiting rays have the same angle of incidence so that all main rays pass through the double prism in the same manner. The rays (23a, 23b, 23c) emanate from a point 33 on object 34 and enter the measuring lens 21 after being reflected at mirror 32. The rays (23a, 23b, 23c) are imaged at point 24 in the image plane 25b. Here too, the two image planes 25a and 25b are inclined toward each other.

All optical conditions presented with respect to FIG. 1 apply also to the objective 21 shown in FIG. 2 except for the two measuring regions since the objective 21 supplies only a linear-shaped measuring region.

Figure 3:
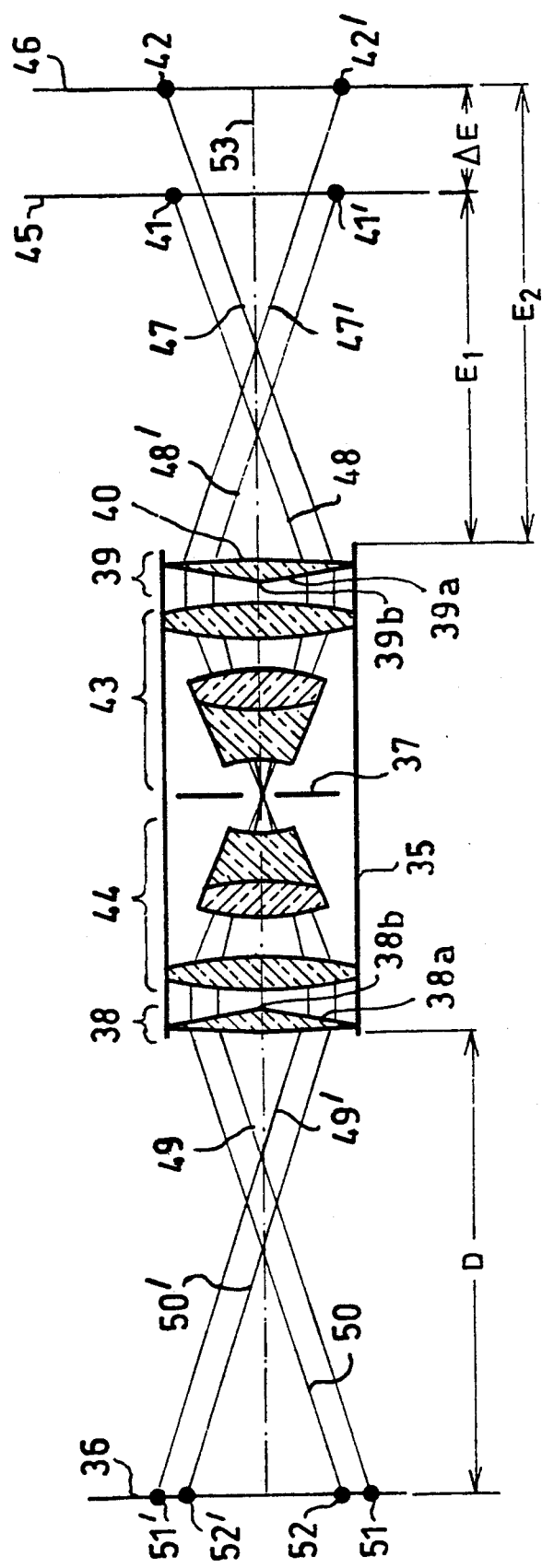

FIG. 3 shows an objective 35 which is used for distance measurement. The objective 35 defines an optical axis 53 and corresponds to the configuration of the objective 1 of FIG. 1.

With the objective 35, the surface (45, 46) of a structured object is imaged on a sensor image plane 36. On the one hand, the structuring (circular pattern, grating or the like) necessary to carry out the measurement can be on the surface of the object to be measured and be there permanently and therefore does not have to be projected onto this object surface; while, on the other hand, if no permanent structuring is on the surface of the object, then structuring must be projected onto the object surface. The sensor (for example, a CCD-sensor) in the sensor image plane 36 should make possible the recordation of a line or surface image so that the sensor must not be moved in the measuring image plane 36 for a measurement.

The inclined main rays (48, 48') emanate from the object points (41, 41') and impinge on the outer boundary surface 40 of the beam deflecting unit 39 configured as a double prism. The telecentric objective 35 has a 1:1 imaging and has two lens groups (44, 43) arranged mirror-symmetrically to the inner diaphragm 37 as well as its two beam deflecting units (38, 39) arranged likewise mirror-symmetrically to the diaphragm 37. The objective 35 ensures that the inclined incident main rays (48, 48') again leave the objective 35 inclined in the direction toward the sensor image plane 36. The spacing D between the beam deflecting unit 38 mounted on the image side and the sensor image plane 36 is held constant. For this reason, the distance of the incidence points (51, 51') of the main rays (49, 49') at the image side yields the distance E1 of the surface 45 to be measured from the objective 35.

If the distance E1 of the object is increased by $\Delta E$, then the object is at a distance E2 from the objective 35. At the same time, the surface 45 to be measured is moved to 46 from the objective 35. The main rays (47, 47') emanating from the object points (42, 42') incident further out on the outer boundary surface 40 of the beam deflecting unit 39 configured as an optical wedge. The main rays (50, 50') which emanate from the objective 35 are incident on the sensor image plane 36 at other incident points (52, 52') which lie closer to each other. The location change of the incident points (51, 51'; 52, 52') with respect to each other is then in a linear relationship to the distance change $\Delta E$ of the objective to be measured relative to the objective 35.

The use of the objective 35 as a range finder is possible in the region of adequate depth of field since, to measure range, only adequately definable radiation points must be incident on the sensor image plane 36. In this way, $\Delta E$-measurement in the mm-range is realizable so that the objective 35 is highly suitable for stabilizing a distance adjustment.

It is understood that the foregoing description is that of the preferred embodiments of the invention and that various changes and modifications may be made thereto without departing from the spirit and scope of the invention as defined in the appended claims.

What is claimed is:

1. An objective for measuring distances comprising:
   at least one lens group defining an optical axis and including a plurality of lenses;
   a first beam deflecting unit mounted on said axis forward of said lens group to define a beam entry surface;
   a second beam deflecting unit mounted on said axis rearward of said lens group to define a beam exit surface;
   said first deflecting unit including a refracting optical prism having a first side extending above and below said optical axis and defining said entry surface and having a second side likewise extending above and below said optical axis and facing away from said first side;
   said second deflecting unit including a refracting optical prism having a first side extending above and below said optical axis and defining said exit surface and having a second side likewise extending above and below said optical axis and facing away from said first side of said refracting optical prism of said second deflecting unit;
   said prism of said first deflecting unit having a first linear edge formed on one of said sides thereof and said prism of said second deflecting unit having a second linear edge formed on one of said sides thereof; and,
   said first and second linear edges being substantially perpendicular to said optical axis and being substantially parallel to each other.

2. The objective of claim 1, said plurality of lenses of said lens group being arranged so as to cause said objective to supply a telecentric image.

3. The objective of claim 1, wherein an opening bundle of rays emanates from an object; and, said lens group and said deflecting units are configured so as to cause the total optical path length of the rays of said opening bundle to be the same length through at least both of said deflecting units.

4. The objective of claim 1, said optical prisms each having first and second prismatic faces disposed above said optical axis; said first and second prismatic faces defining an angle therebetween and said angle being selected so that the sum of all of said optical prisms does not cause additional astigmatism to result.

5. The objective of claim 1, said optical prisms each having first and second prismatic faces disposed above said optical axis; said first and second prismatic faces conjointly defining an angle therebetween; the angle of each of said prismatic faces being selected so that the combination of both deflections does not generate additional astigmatism.

6. The objective of claim 1, said one lens group being a first lens group and said objective having an objective center point and further comprising a second lens group mounted on said optical axis between said first lens group and said second deflecting unit; and, said first and second lens groups being arranged symmetrically with respect to said center point.

7. The objective of claim 1, said one lens group being a first lens group and said objective having an objective center point and further comprising a second lens group mounted on said optical axis between said first lens group and said second deflecting unit; and, said first and second deflecting units also being arranged symmetrically with respect to said center point.

8. The objective of claim 1, said objective having an imaging ratio 1:1.

9. The objective of claim 1, each of said optical prisms being configured so as to be mirror symmetrical with respect to a plane passing through the edge thereof.

10. The objective of claim 1, said edges of said optical prisms conjointly defining a plane containing said optical axis.

11. The objective of claim 1, each of said optical prisms having only planar surfaces for passing rays.

12. The objective of claim 1, said one side of said prism of said first deflecting unit being defined by an upper prismatic planar surface above said optical axis and a lower prismatic planar surface below said optical axis; and, said prismatic planar surfaces being mutually abutting to conjointly define said first linear edge perpendicular to said optical axis; and, said one side of said prism of said second deflecting unit being defined by an upper prismatic planar surface above said optical axis and a lower prismatic planar surface below said optical axis; and, said prismatic planar surfaces of said prism of said second deflecting unit being mutually abutting to conjointly define said second linear edge perpendicular to said optical axis.

13. An objective for measuring distances comprising:
a lens group defining an optical axis and including a plurality of lenses;
a beam deflecting unit mounted on said axis forward of said lens group;
said beam deflecting unit including a refracting optical prism having a first side away from said lens group and a second side facing toward said lens group;
said beam deflecting unit including a refracting optical prism having a first face on said first side defining a beam entry surface for receiving a beam which is passed by said optical prism to said lens group;
mirror means mounted on said axis rearward of said lens group for reflecting the beam back into said lens group and toward said optical prism;
said refracting optical prism having a second face formed on said first side to define a beam exit surface through which said beam passes after passing through said refracting optical prism;
said first and second sides both extending above and below said optical axis;
said optical prism having a linear edge formed on one of said sides thereof; and,
said linear edge being substantially perpendicular to said optical axis.

14. The objective of claim 13, said one side of said prism being defined by an upper prismatic planar surface above said optical axis and a lower prismatic planar surface below said optical axis; and, said prismatic planar surfaces being mutually abutting to conjointly define said linear edge perpendicular to said optical axis.

* * * * *

UNITED STATES PATENT AND TRADEMARK OFFICE
CERTIFICATE OF CORRECTION

PATENT NO. : 5,289,316
DATED : February 22, 1994
INVENTOR(S) : Gerd Fürter

It is certified that error appears in the above-identified patent and that said Letters Patent is hereby corrected as shown below:

In column 2, line 61:　delete "have".

In column 2, line 63:　between "wedges" and "planar" insert -- have --.

Signed and Sealed this

Fourteenth Day of June, 1994

Attest:

BRUCE LEHMAN

Attesting Officer　　　　Commissioner of Patents and Trademarks